(12) United States Patent
Mazur

(10) Patent No.: US 7,424,209 B2
(45) Date of Patent: Sep. 9, 2008

(54) SYSTEM AND METHOD FOR REAL-TIME DATA ARCHIVAL

(75) Inventor: Leszek Mazur, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 915 days.

(21) Appl. No.: 10/367,375

(22) Filed: Feb. 13, 2003

(65) Prior Publication Data

US 2004/0170383 A1    Sep. 2, 2004

(51) Int. Cl.
*H04N 5/00* (2006.01)

(52) U.S. Cl. .................. 386/125; 386/68; 707/204

(58) Field of Classification Search .......... 386/68, 386/125; 707/204
See application file for complete search history.

(56) References Cited

U.S. PATENT DOCUMENTS

| | | | |
|---|---|---|---|
| 5,938,752 A | 8/1999 | Leung et al. | |
| 5,940,148 A | 8/1999 | Joseph et al. | |
| 5,973,625 A * | 10/1999 | Nam | 341/50 |
| 6,038,628 A | 3/2000 | Leung et al. | |
| 6,266,729 B1 | 7/2001 | Leung et al. | |
| 6,272,581 B1 | 8/2001 | Leung et al. | |
| 6,453,116 B1 | 9/2002 | Ando et al. | |
| 6,456,783 B1 | 9/2002 | Ando et al. | |
| 6,731,602 B1 * | 5/2004 | Watanabe et al. | 370/231 |
| 6,940,901 B2 * | 9/2005 | Kato | 375/240.01 |
| 6,973,258 B1 * | 12/2005 | Yoo et al. | 386/111 |
| 7,027,712 B2 * | 4/2006 | Klausberger et al. | 386/65 |
| 2002/0024908 A1 * | 2/2002 | Kato | 369/53.34 |

OTHER PUBLICATIONS

Anup K. Talukdar, B.R. Badrinath and Arup Acharya. "On Accommodating Mobile Hosts in an Integrated Services Packet Network", 1997, 9 pages.

* cited by examiner

*Primary Examiner*—Thai Tran
*Assistant Examiner*—Girumsew Wendmagegn
(74) *Attorney, Agent, or Firm*—Amin, Turocy & Calvin, LLP

(57) ABSTRACT

Systems and methods for archiving real-time data are provided. Real-time data transport files can be transferred from a data store to an output data store for play back on digital devices, such as digital VCR and digital display devices. A synchronizer component facilitates the generation of real-time timestamps from a plurality of reference timestamps for recording the real-time data transport files onto the output data store via a digital recording device.

16 Claims, 5 Drawing Sheets

SYSTEM AND METHOD FOR REAL-TIME DATA ARCHIVAL

TECHNICAL FIELD

This invention relates to the field of archiving data, and more particularly, to systems and methods for archiving real-time data from a data store to an output data store.

BACKGROUND OF THE INVENTION

Current digital TV broadcasts employ MPEG transport streams. MPEG transport streams are projected to be utilized as a standard in the field of video digital broadcast. In such digital broadcasts, the contents (e.g., video information) to be broadcasted are time-divided into groups of data each having a predetermined size (e.g., 188 bytes) called transport packets, and broadcast data is sent in units of transport packets.

As a streamer for recording digital broadcast data, a home digital VCR such as D-VHS (digital VHS), or the like, is commercially available. A streamer using D-VHS records a broadcasted bitstream on a tape. For this reason, a plurality of programs can be multiplexed and recorded on a video tape.

Upon playback, all data are output from the VCR to a set-top box (digital TV reception apparatus) when they are played back from the beginning or middle of the tape. In the set-top box, a desired program is selected from the output data by user operation of the like. The selected program information is transferred from the set-top box to a digital TV receiver, and is played back (playback of video, audio, and the like). Because the D-VHS streamer uses a tape as a recording medium, it cannot attain quick random access, and it is difficult to quickly jump to a desired position of a required program so as to play it back.

In digital TV, video data is broadcasted while its information is compressed using a digital compression scheme known as MPEG-2. In MPEG-2, P-picture information has only differential information from I-picture, and B-picture information has only differential information from I-and P-pictures. Therefore, B- or P-picture cannot be solely played back, and playback from I-picture is required to playback these pictures. Note that video playback time viewed from the user, which is indicated by display times of I-, B-, and P-pictures, is different from the time stamp information. For this reason, when time management for stream data recorded on the information storage medium is made using time stamp data, control of the display time (video playback time) for the user cannot be accurately made.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention is related to systems and methods for archiving real-time data from a data store, such as a hard drive or memory of a computer, to an output data store, such as a digital tape that can be used with a digital VHS machine. The output data store could also be a digital display device such as a digital television. The data store contains real-time data stored as data packets (e.g., in accordance with the ISO/IEC 13818-1 standard). A portion of the data packets contain reference timestamps which were created at a certain clock rate (e.g., 27 MHz). To properly transfer the data packets to the output data store; each packet requires a corresponding real-time timestamp. However, a digital recording device can employ a different clock rate than the clock rate that the reference packets were created. For example, if the real-time data is sent from the data store to the output data store over a 1394 connection, the required clock rate is 24.576 MHz. Moreover, if the real-time data is of MPEG-2 format, standard IEC 61883-4 requires each packet of real-time data to be wrapped in a source packet. The source packet contains the information from the original packet, as well as a 4-byte header where a real-time timestamp is placed.

Accordingly, the system and method of the present invention includes a synchronizer component for generating the real-time timestamps for each data packet. The synchronizer component synchronizes a first time base, or clock rate, of the reference timestamps and a second time base, or clock rate, required by digital recording device, which records the data to the output data file.

A device driver is also included for transmitting the data packets from the data store to the output data store at a rate dictated by the timestamps. An example of one such device driver is Microsoft MSTAPE®. The data packets being archived can contain high definition audio and/or video data, and the output data store can be a digital television or a digital VHS machine.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
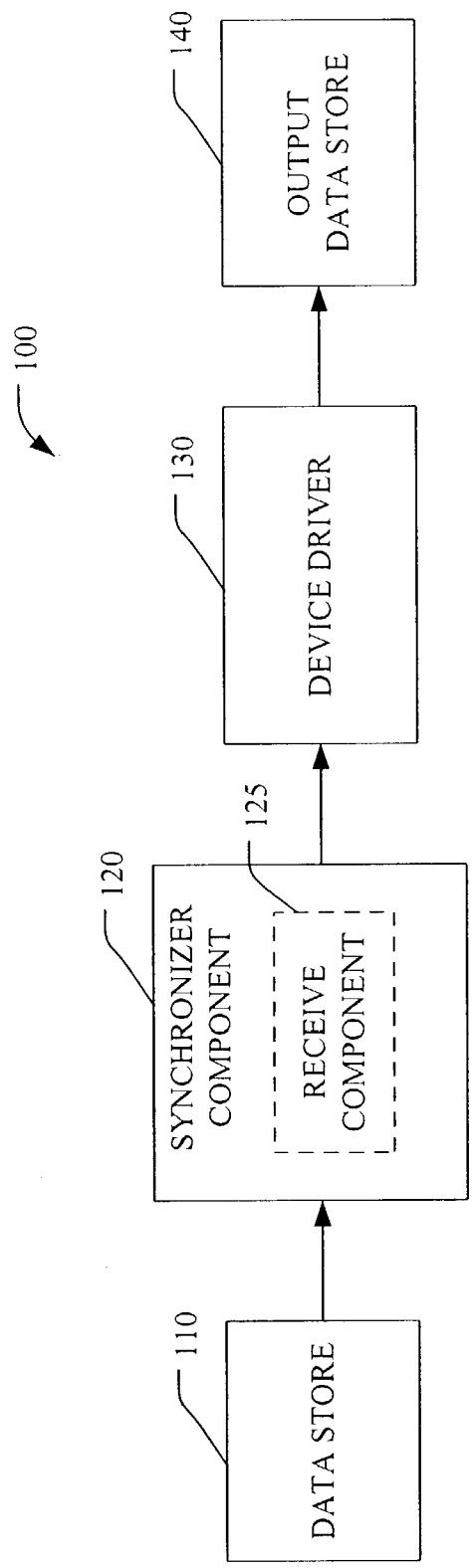
FIG. 1 is a schematic block diagram illustrating a real-time data archival system in accordance with an aspect of the present invention.

The present invention relates to a system and methodology for transmitting signals in real-time to be archived by digital storage components, such as a digital VHS tape. The digital storage components store media for play back on digital devices, such as digital VCR and digital display devices. The present invention facilitates the generation of real-time timestamps to allow archiving of hi-definition audio/visual signals onto the digital storage components.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Referring initially to FIG. 1, a real-time data archival system 100 is illustrated in accordance with an aspect of the present invention. The real-time data archival system 100 includes a data store 110, a synchronizer component 120, a device driver 130, and an output data store 140. The data store 110 can include a computer hard drive, memory, CD-ROM, digital versatile disks (DVD), other magnetic storage devices, or any other medium which can be used to store desired information and which can be accessed by a computer. There currently exist hi-definition computer cards, which allow users to download or transfer real-time data streams, such as audio and/or video streams, to the data store 110. However, it is to be appreciated that any other device or method for transferring real-time data streams to a data store can be employed. Data streams are data transmitted on a wired or wireless data communication path in the form of a packet structure. The data streams can be recorded on an information storage medium while holding a packet structure.

To mitigate exceeding a capacity of the data store 110, the real-time data streams can be transferred to the output data store 140 for archival of the real-time data streams. For example, an audio/video stream for a movie can exceed 18 GBs, which requires a large amount of memory. Accordingly, the user may desire to transfer the movie file from a hard drive of a computer to an output data store, such as a digital tape, so as to save room on the computer hard drive. However, to archive the real-time audio and/or visual data streams onto a digital tape, or the like, the data must be transferred in real-time. A digital tape moves at a constant speed in real time and accordingly, requires a constant data rate. For example, two hours of recording time are typically required to archive a two hour long movie from a computer storage device to a digital tape.

Moreover, to transfer the audio and/or visual data streams from the data store 110 to the output data store 140, the data streams must be sent via the device driver 130 for a digital recording device, such as a digital VHS machine, in real-time. The device driver 130 transmits the data streams from the data store 110 to the output data store 140 at a rate dictated by timestamps contained in individual packets of the data stream. An example of one such device driver is Microsoft MSTAPE®. The data packets being archived can contain high definition audio and/or video data, and the output data store can be a digital television or a digital VHS machine.

The data streams in data store 110 are generally stored as data packets (e.g., in accordance with the ISO/IEC 13818-1standard), a portion of which contain reference timestamps according to a certain clock rate (e.g., 27 MHz). However, to property transfer the data packets to the output data store 140; each packet requires a real-time timestamp. Moreover, the device driver 130 may employ a different clock rate than the clock rate in which the reference packets were created. For example, if the real-time data is sent from the data store 110 to the output data store 140 over a 1394 connection, the required clock rate is 24.576 MHz.

Accordingly, the synchronizer component 120, which will be described in further detail below, is employed prior to transferring the data streams to the device driver 140 to computer and associate real-time timestamps with each packet of data in the audio and/or visual data streams. The synchronizer component 120 includes a receive component 125 that receives at least one transport stream from the data store 110. However, it is to be appreciated that the synchronizer component and receive component are not limited to individual components and may instead comprise one component incorporating the functionality of both. The synchronizer component 120 synchronizes different clock rates, or time bases, e.g. a time base utilized to create reference timestamps and a time base required for the device driver and/or digital recording device. The time bases are synchronized by creating a real-time timestamp on each data packet.

Figure 2:
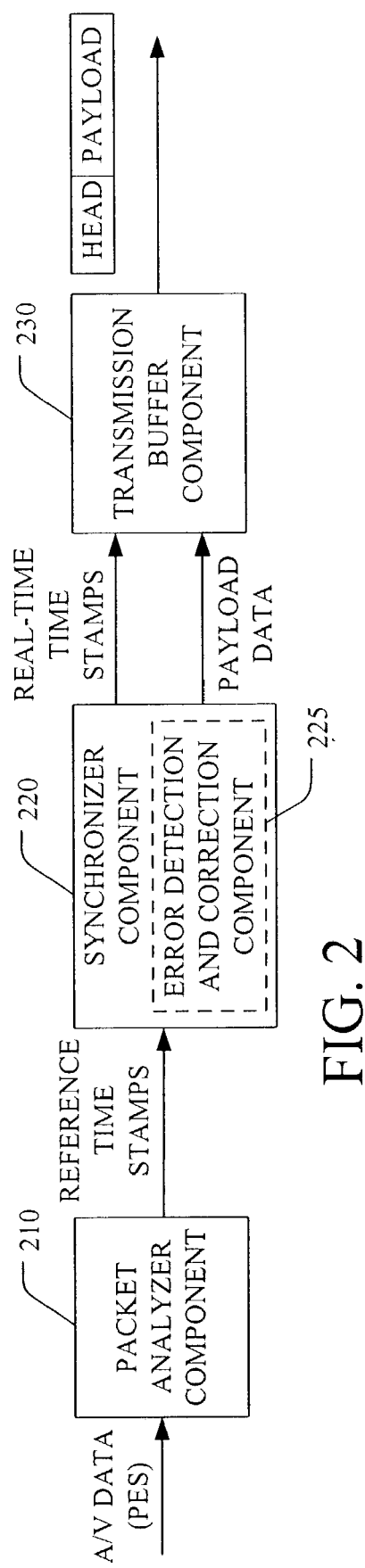
FIG. 2 is a schematic block diagram illustrating an example of a system for generating real-time timestamps in accordance with an aspect of the present invention.

Turning now to FIG. 2, another example of a real-time data archival system 200 is depicted. The real-time data archival system 200 includes a packet analyzer component 210 for analyzing transport stream packets sent from a data store, such as a computer hard drive. The transport stream packet includes reference timestamps and video data streams and/or audio data streams. Moreover, the transport streams can include MPEG-2 transport streams in accordance with ISO/IEC 13818-1. The packet analyzer component 210 analyzes transport stream packets and determines current time information, or reference timestamp information, associated with the packets. A program clock reference (PCR) is embedded as a field in the MPEG-2 transport stream packet. The PCR is a regularly sent sample of a 27 MHz studio-generated timing reference; and is carried as a 33 bit value transmitted typically every 40 ms for each video/audio stream. The PCR is employed to act as a timing beacon for a decoding process at a receive end.

However, the reference timestamps are not associated with every transport stream packet. For example, in the MPEG-2 transport stream, timestamps are associated with a packet every one-tenth of a second. Thus, to transfer audio and/or visual files to the digital recording machine in real-time, timestamps for intermediate packets have to be derived. Accordingly, the analyzed packets are transferred to a synchronizer component 220. Upon receiving a first packet having a reference timestamp, the synchronizer component 220 establishes the first reference timestamp as a reference base. Thus, when a second timestamp is received, the second timestamp can be compared with the reference base to generate real-time timestamps for the packets. Because the transport stream packets are received at a constant rate, the synchronizer component 220 can compute intermediate timestamps based on the reference base timestamp and subsequent timestamps. The synchronizer component 220 associates the computed intermediate timestamps with corresponding transport stream packets.

The synchronizer component 220 can optionally include an error detection and correction component 225. The error detection and correction component 225 can continuously check for valid transport stream packets, dropping bytes that are not part of the packets. For example, each transport stream packet begins with a 0x47 byte marker. If the marker is missing, the error detection and correction component 225 can drop bytes until a 0 x47 byte marker is recognized and a byte at a current position plus one packet size (e.g., 188 bytes) is also 0x47.

Additionally, or alternatively, the error detection and correction component 225 can include at least two configurable settings to correspond with various decoders, such as MPEG-2 decoders. A first configurable setting includes a maximum delta setting. The maximum delta setting is a predetermined amount of time that can pass between reference clocks before a clock base is reset. If the error detection and correction component 225 detects a packet loss where the delta is below the maximum delta setting, the error detection and correction component 225 can fill the gap with null packets, such that there is no interruption in packet delivery. However, if the delta is above the maximum delta setting, the error detection and correction component 225 resets a base clock. The base clock resets correspond to resets found in a decoder. If the resets do not correspond, a buffer under/overrun can occur. A second configurable setting includes a program clock reference offset setting. The error detection and correction component 225 can optionally adjust a program clock reference backwards or forwards in time to allow correct audio and video synchronization. Some decoders require an audio buffer to have at least 300 ms of audio prior to outputting any audio. As video streams include program clock references, while audio streams do not, the error detection and correction component 225 can adjust the amount of audio in a buffer by adjusting the program reference clock.

It is to be appreciated that the synchronizer component and error detection and correction component are not limited to individual components and may instead comprise one component incorporating the functionality of both.

Figure 3:
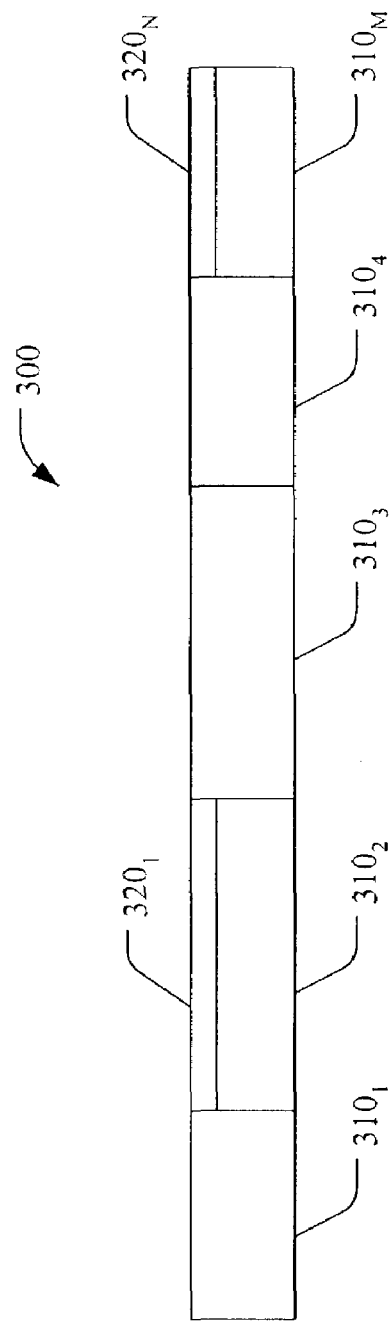
FIG. 3 is a schematic block diagram illustrating an example of a transport stream in accordance with an aspect of the present invention.

FIG. 3 depicts an example transport stream 300 in accordance with an aspect of the present invention. The transport stream 300 includes a plurality of transport stream packets $310_1$ through $310_M$, M being an integer greater than or equal to one. At least two of the transport stream packets 310 include reference timestamps, $320_1$ through $320_{N, N}$ being an integer greater than or equal to two. The reference timestamps 320 are utilized to compute, or generate, real-time timestamps for the packets 310 which do not contain reference timestamps 320. As discussed above, the reference timestamps 320 determined by the PCR generally have a base of 27 MHz. However, a digital recording device may require that the timestamps have a different time base. For example, the digital recording device may require that the data packets be sent over an IEEE-1394, Firewire connection. Thus, the computed real-time timestamps must have time base corresponding to the data transmission. In the case of employing an IEEE-1394, Firewire transmission, the real-time timestamps must have a 24.576 MHz base. However, it is to be appreciated that any timestamps of any time base can be generated and generally relates to a data transmission rate for the transport stream packet. Yet, merely interpolating intermediate real-time timestamps from the reference timestamp 320 is not always accurate and/or reliable enough for real-time data transmission to a digital recording device.

Accordingly, turning back to FIG. 2, the synchronizer component 220 can account for any rounding off errors that might be present. Moreover, subsequent reference timestamps are compared to the reference base, rather than the preceding timestamp, to determine real-time intermediate timestamps to mitigate compounding rounding errors. Moreover, the synchronizer component 220 can compare a predicted timestamp for a transport stream packet that has an embedded PCR. The embedded PCR timestamp is converted to match the time base of the generated timestamps, such that the predicted timestamp can properly be compared to an actual timestamp. If the predicted timestamp does not correspond with the PCR, the synchronizer component 220 readjusts the predicted clock by adding or subtracting a unit of time until the predicted clock corresponds with the actual clock; otherwise, an overrun or underrun buffer error can result.

After at least one of the real-time timestamps are computed by the synchronizer component 220, the real-time timestamps, along with corresponding payload data (e.g., audio and/or visual data) are transferred to a transmission buffer component 230. The transmission buffer component 230 transfers the transport stream packets, which include a payload portion and a header portion, the header portion containing a computed real-time timestamp. The transport stream packets are then recorded onto an output data store via a digital recording device, such as a digital VHS device. The digital recording device can include a transmission driver, such as that built into MICROSOFT® WINDOWS XP® (e.g., MSTAPE), future versions of MICROSOFT® operating systems, or any other suitable operating system.

An example algorithm for creating a real-time timestamp is as follows:

```
Real-time timestamp (RTT) = 0;
Source packet interval (SPI) = 0;
While there are timestamp packets available
{
    Read the next timestamp packet.
    Increment timestamp packet counter for each program identifier in the array.
    If the packet contains a reference timestamp
    {
        add the timestamp information to the array under that program identifier
        if there are two consecutive reference timestamps for that program
    identifier in the array
        {
            compute the new interval between timestamp packets by dividing
    the delta between the two timestamps by the total number of timestamp packets that
    occurred between them (timestamp packet counter for that program identifier)
            set the source packet interval to the newly computed interval.
            Reset the program identifiers timestamp counter to 0
```

-continued

```
        }
        else
        {
            this is a first reference timestamp for that program identifier
            set the program identifiers timestamp counter to 0
        }
        if source packet interval > 0
        {
            create a source packet by stamping the timestamp packet with the
   current real-time timestamp
            increment the real-time timestamp by the source packet interval.
        }
    }
}
```

Figure 4:
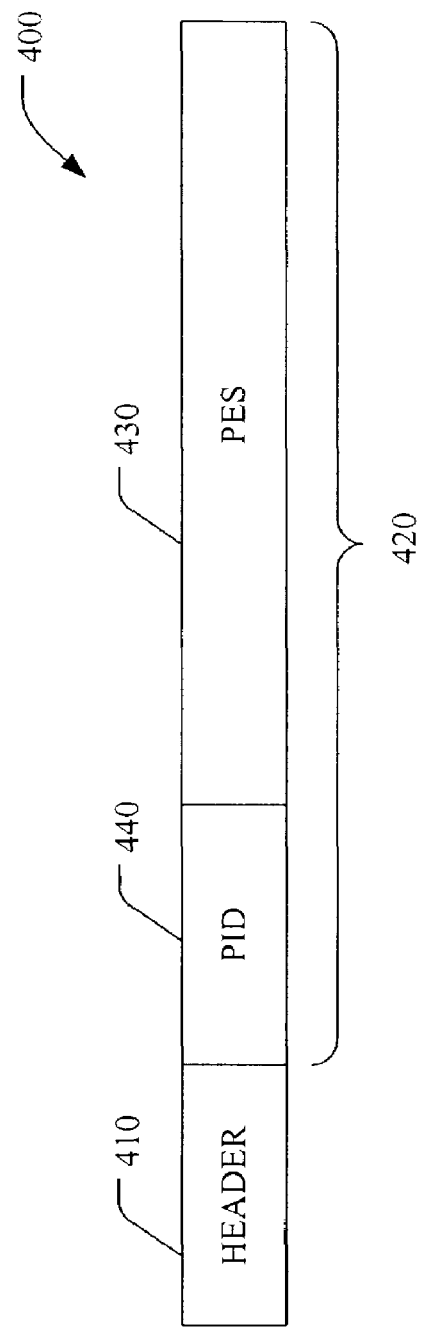
FIG. 4 is a schematic block diagram illustrating an example of a transport stream packet in accordance with an aspect of the present invention.

Referring to FIG. 4, an example of an MPEG-2 transport stream data packet 400 is illustrated. The MPEG-2 transport stream packet 400 can include one or more programs and has a fixed length packet structure. Transport streams are designed for unreliable or error-prone environments, such as network broadcasts. The transport streams can also support multiple programs that are synchronized to different clocks. Each transport stream packet 400 comprises a 4-byte header 410, plus an optional adaptation field that contains additional header information. The data packet 400 also includes a 184 byte payload portion 420. The payload portion 420 includes a packetised elementary stream (PES) 430. The PES 430 contains real-time data, such as audio and/or video data which may be displayed on a screen and through speakers at a given point in time. A multiplexer assigns a program ID (PID) 440 to each PES stream 430 or program information stream. PIDs 440 are generally employed to identify transport stream packets, similar to the way stream IDs identify PES packets. If a transport stream contains multiple programs, the stream IDs might not be unique, but the PID assignments are unique within the transport stream.

In general, PES packets have variable length, not corresponding to the fixed packet length of transport packets, and may be much longer than the transport packet. When transport packets are formed from a PES stream, the PES header is always placed at the beginning of a transport packet payload, immediately following the transport packet header. A remaining PES packet content fills payloads of successive transport packets until the PES packet is all used. The final transport packet is filled to a fixed length by stuffing with bytes=0xFF (all ones).

Each PES packet header includes an 8-bit stream ID identifying the source of the payload. Among other things, the PES packet header may also contain timing references: PTS (presentation time stamp, the time at which a decoded audio or video access unit is to be presented by the decoder); DTS (decoding time stamp, the time at which an access unit is decoded by the decoder); ESCR (elementary stream clock reference).

When an MPEG-2 timestamp is transmitted over a 1394 connection, each packet is typically wrapped by a source packet, as defined in IEC 61883-4, for example. A source packet can be a 192 byte packet, which includes a 4 byte header containing a real-time timestamp and a 188 byte payload containing the transport stream packet. The source packets can then be transmitted via a 1394 connection to a digital recording device, such as D-VHS, at substantially a time indicated by the real-time timestamp.

Figure 5:
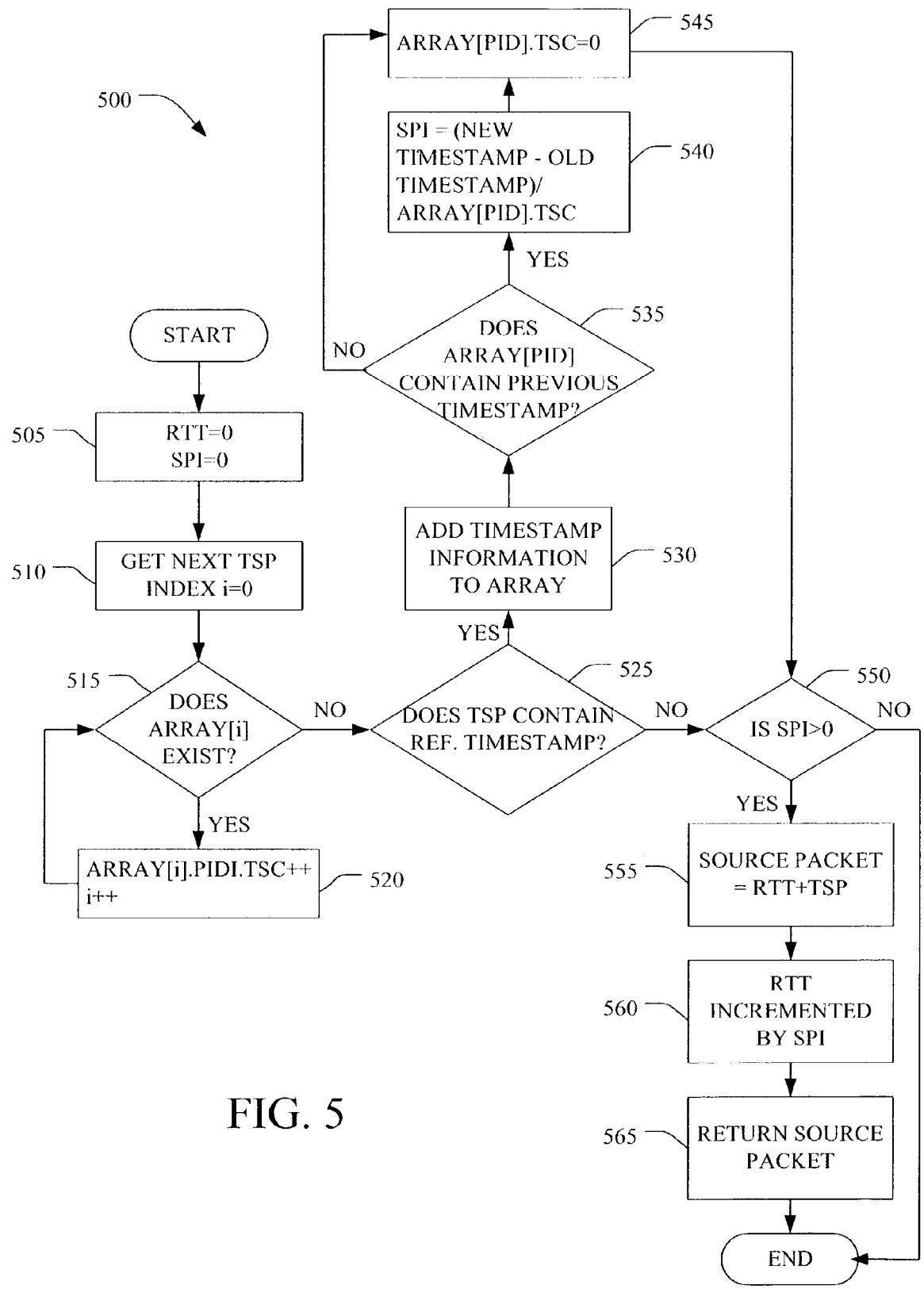
FIG. 5 is a flow diagram illustrating an example of a methodology for generating real-time timestamps in accordance with an aspect of the present invention.
Figure 6:
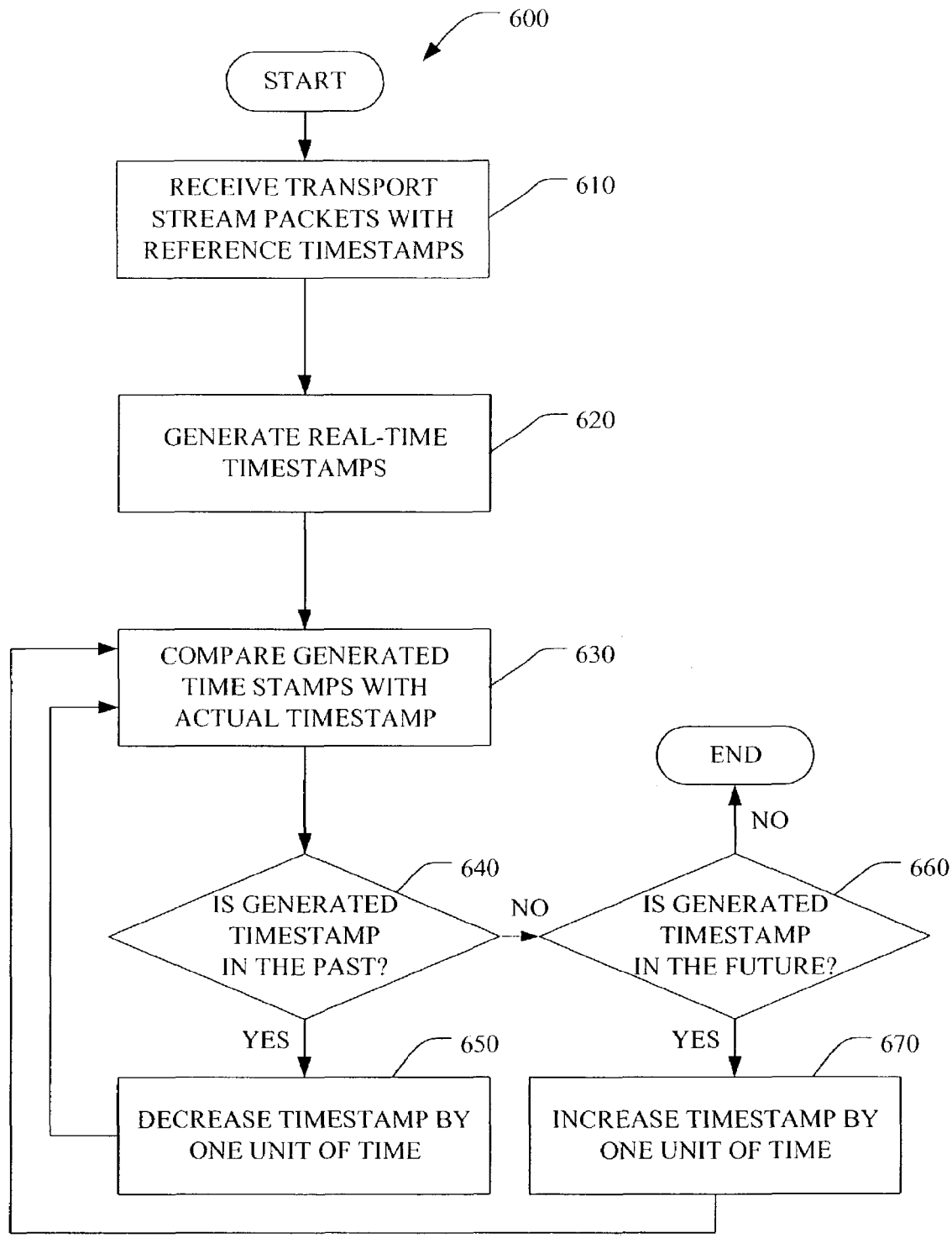
FIG. 6 is a flow diagram illustrating an example of a methodology for adjusting generated real-time timestamps in accordance with the present invention.

In view of the foregoing structural and functional features described above, methodologies in accordance with various aspects of the present invention will be better appreciated with reference to FIGS. 5 and 6. While, for purposes of simplicity of explanation, the methodologies of FIGS. 5 and 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

The present invention can be employed in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments. Furthermore, while the descriptions of FIGS. 5 and 6 refer to specific data formats and processor speeds, the descriptions are simply examples of types of data and different components that may be used in accordance with the present invention. The descriptions of FIGS. 5 and 6 are not meant to limit the scope of the invention in any way.

Turning now to FIG. 5, a methodology 500 for generating real-time timestamps is illustrated in accordance with an aspect of the present invention. At 505, a first reference timestamp (RTT) encountered is set as a base reference timestamp. The base reference timestamp is the timestamp in which future calculations are based. Additionally, at 505, a source packet interval (SPI) is set to zero. At 510, a data packet with a second reference timestamp is read. It is determined whether there is an array at 515. An array contains timestamp information (PIDI) for each program identifier (PID) that is encountered, which contains reference timestamps, as well as, a number of packets between the reference timestamps. If there is an array (YES), the timestamp packet counter is incremented for each program identifier in the array at 520. If there is not an array (NO), it is determined whether the packet contains a timestamp at 525. If the packet does not contain a timestamp (NO), the methodology 500 proceeds to 550, as will be discussed in greater detail below. However, if the packet does contain a timestamp (YES), at 530, the timestamp information is added to the array under the corresponding program identifier.

Then, at 535, it is determined whether there are two consecutive reference timestamps for that particular program identifier in the array. If yes, a new interval is computed between the timestamp packets at 540. The interval is created by dividing a delta between the two timestamps by a total number of timestamp packets that occurred between them, which is a timestamp packet counter for the corresponding program identifier. However, there are instances when two different time bases are employed, e.g., one time base for 27 MHz reference timestamps and another time base for generated 24.576 MHz (e.g., Firewire) timestamps. Accordingly the delta is modified to account for the differences in the time bases. For example, the real-time timestamps can be computed by first dividing a Firewire delta by a number of packets received between reference timestamps to determine an increment value. The number of increments corresponding to the number of packets is then added to a Firewire base; e. g. for a $100^{th}$ packet after the base reference timestamp, the Firewire base is incremented 100 times by a value derived by dividing the Firewire delta by the number of packets between reference timestamps. Accordingly, real-time timestamps can be computed not only for packets between the packets containing reference time-stamps, but for future packets.

When the interval is computed, the source packet interval is then set to the newly computed interval. The methodology 500 proceeds to 545 where the program identifiers timestamp counter is reset to zero. However, if at 535, it is determined there are not two consecutive reference timestamps for the particular program identifier in the array (NO), it is determined at 545 that the reference timestamp is the first reference timestamp for that program identifier and the program identifiers timestamp counter is reset to zero. The methodology 500 then proceeds to 550 where it is determined whether a source packet interval is greater than zero. If the source packet interval is not greater than zero (NO), the methodology 500 ends. However, if the source packet interval is greater than zero (YES), a source packet is created by stamping the timestamp packet with the current real-time timestamp at 555. At 560, the real-time timestamp is incremented by the source packet interval; and at 565, the source packet is returned and the methodology 500 ends.

Turning now to FIG. 6, a methodology 600 for adjusting generated real-time timestamps is depicted in accordance with an aspect of the present invention. At 610, transport stream packets are received having reference timestamps embedded within at least two transport stream packets. At 620, real-time timestamps are generated for those transport stream packets which do not have embedded timestamps. However, because the real-time timestamps must be discreet, round-off errors may occur during the generation of the timestamps. Thus a computed real-time timestamp may be either too fast or too slow. Accordingly, at 630, the generated time stamps are compared with actual timestamps. It is determined whether the generated time stamps are in the past with respect to the actual timestamp at 640(e.g., whether the actual timestamp has a larger value than the generated timestamp). If the generated timestamps do occur in the past (YES), the packets are being transmitted too fast and are arriving too early at their destination. Accordingly, the timestamp generation rate is decreased by one unit of time at 650. For example, the timestamp generation rate can be decreased by increasing a time delta between timestamps. The methodology 600 then returns to 630 where the generated timestamp is compared to the actual timestamp. If however, at 640,it is determined that the generated timestamp does not occur in the past with respect to the actual timestamp (NO), the methodology 600 proceeds to 660. At 660, it is determined whether the generated timestamp occurs in the future with respect to the actual timestamp (e.g., whether the actual timestamp has a smaller value than the generated timestamp). If the generated timestamp does not occur in the future (NO), the generated timestamp is deemed to be accurate and the methodology 600 ends. If, however, the generated timestamp does occur in the future (YES), the packets are being transmitted too slow and arrived too late at their destination. Accordingly, the timestamp generation rate is increased by one unit of time. For example, the timestamp generation rate can be increased by decreasing a time delta between timestamps. The methodology 600 then returns to 630.

Figure 7:
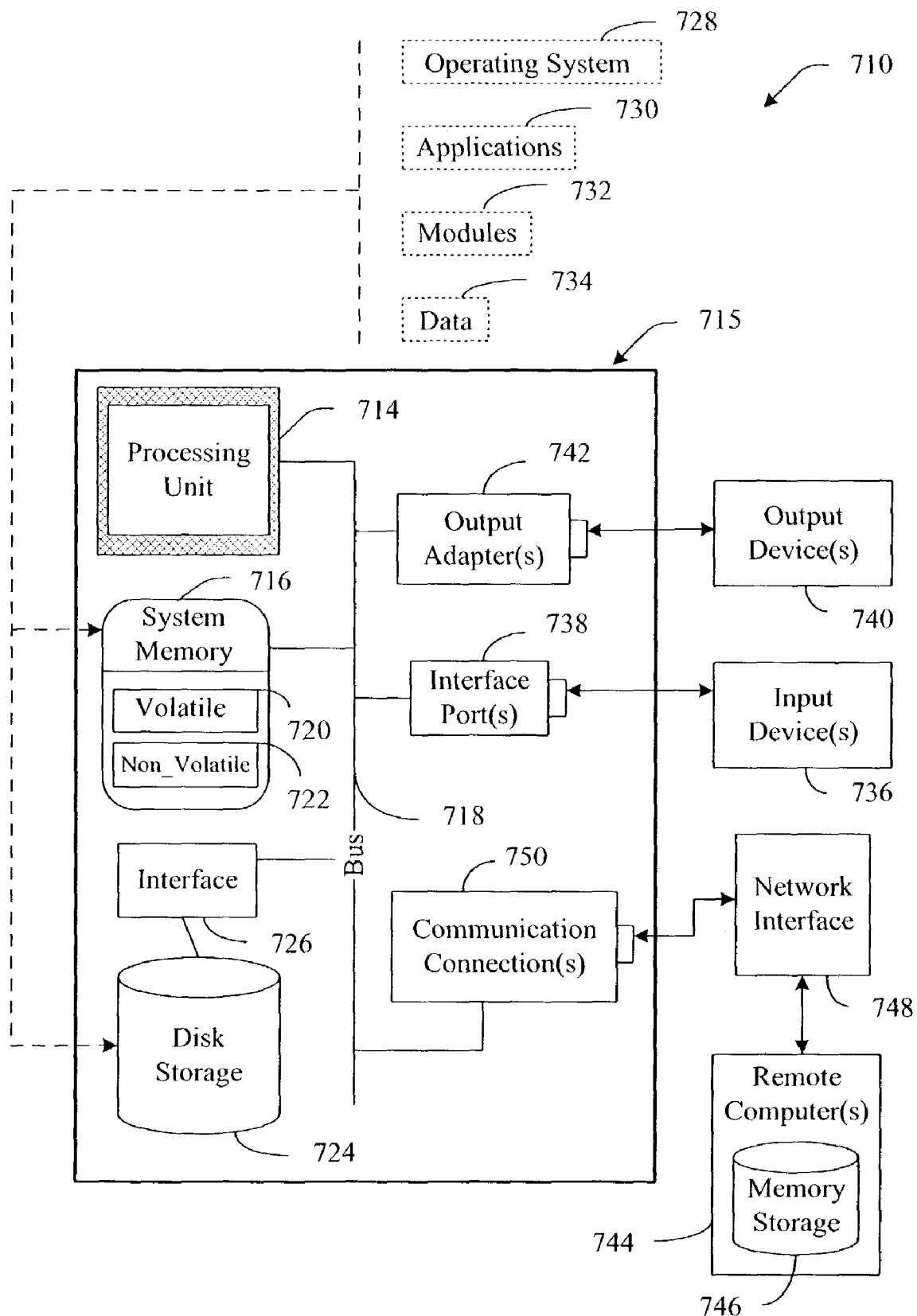
FIG. 7 is a schematic block diagram illustrating exemplary environment for implementing various aspects of the invention.

With reference to FIG. 7, an exemplary environment 710 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (FSDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the present invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A real-time data archival system comprising:
   a receive component that receives at least one transport stream; and
   a synchronizer component that generates real-time timestamps for each transport stream packet contained within one of the at least one transport stream based at least in part on reference timestamps and a measure of the amount of the transport stream packets, a portion of transport stream data packets received by the receive component include embedded reference timestamps, the generated real-time timestamps require a different time base than the reference timestamps, the synchronizer component synchronizes the time base of the generated real-time timestamps with the reference timestamps, and the synchronizer component includes an error detection and correction component including at least two configurable settings, further including at least one of a maximum delta setting and a program clock reference offset setting.

2. The system of claim 1, wherein the at least one transport stream includes transport stream packets according to standard ISO/IEC 13818-1.

3. The system of claim 1, wherein the at least one transport stream is formatted as an MPEG-2 transport stream.

4. The system of claim 1, wherein the transport stream packets having the generated real-time timestamps are archived on a digital tape.

5. The system of claim 1, wherein the transport stream packets having the generated real-time timestamps are archived on a digital display device.

6. The system of claim 1, further comprising a device driver that transfers the at least one transport stream to an output data store.

7. The system of claim 1, wherein the time bases are synchronized by wrapping the transfer stream packets in a source packet, wherein the generated real-time timestamps are placed in a header of the source packet.

8. A system for generating timestamps comprising:
   a packet analyzer component that analyzes a plurality of transport stream packets received from a data store and determines reference timestamps located in a portion of the plurality of transport stream packets;
   a synchronizer component that generates real-time timestamps based on the reference timestamps and a measure of the amount of the plurality of transport stream packets, a portion of transport stream data packets received by the receive component include embedded reference timestamps, the real-time timestamps are generated according to a time base that differs from the reference timestamps, the synchronizer component synchronizes the time base of the generated real-time timestamps with the reference timestamps, and the synchronizer component includes an error detection and correction component including at least two configurable settings, further including at least one of a maximum delta setting and a program clock reference offset setting; and
   a transmission buffer component that transfers the plurality of transport stream packets to a digital recording device.

9. The system of claim 8, wherein the transport stream packets are formatted as MPEG-2.

10. The system of claim 8, wherein the reference timestamps are based on a 27 MHz program reference clock.

11. The system of claim 8, wherein the synchronizer component establishes a first received reference timestamp as a base reference, wherein the base reference is employed in conjunction with a subsequent reference timestamp to generate the real-time timestamps for the transport stream packets.

12. The system of claim 8, wherein the real-time timestamps are generated according to a 24.576 MHz clock rate and the reference timestamps are set according to a 27 MHz clock rate.

13. A method for facilitating data formatting in connection with archiving and/or transmitting audio visual data comprising:
   identifying a measure of the amount and reference timestamps associated with a plurality of data packets;
   generating a plurality of real-time timestamps for the plurality of data packets based at least in part on synchronizing the reference timestamps;
   determining an actual timestamp for at least one of the plurality of data packets and a predicted real-time timestamp for the data packet and comparing the actual timestamp with the predicted real-time timestamp; and
   adjusting the generated real-time timestamps based on the actual timestamp, wherein the generated real-time timestamps are adjusted by one of decreasing a time delta between the generated timestamps by a unit of time if the predicted real-time timestamp occurs in the past with respect to the actual timestamp and increasing a time delta between the generated timestamps by a unit of time if the predicted real-time timestamp occurs in the future with respect to the actual timestamp.

14. The method of claim 13, wherein a first clock rate of the plurality of reference timestamps differs from a second clock rate of the plurality of real-time timestamps.

15. The method of claim 13, wherein the plurality of real-time timestamps are generated by at least in part on establishing a first reference timestamp as a reference base and comparing subsequent reference timestamps against the reference base.

16. The method of claim 13, wherein the actual timestamp is determined by converting a clock rate of at least one of the plurality of reference timestamps into a second clock rate employed to generate the plurality of real-time timestamps.

\* \* \* \* \*